United States Patent [19]

Allen

[11] Patent Number: 4,759,567
[45] Date of Patent: Jul. 26, 1988

[54] AIR SUSPENSION SYSTEM

[75] Inventor: Robert J. Allen, London, England

[73] Assignee: Silentride Suspensions Limited, Welling, England

[21] Appl. No.: 939,062

[22] Filed: Dec. 8, 1986

[30] Foreign Application Priority Data

Dec. 17, 1985 [GB] United Kingdom ................ 8531038
Feb. 25, 1986 [GB] United Kingdom ................ 8604584

[51] Int. Cl.⁴ ............................................. B60G 11/26
[52] U.S. Cl. ..................................... 280/713; 280/725
[58] Field of Search ............... 280/724, 725, 716, 711, 280/713, 690

[56] References Cited

U.S. PATENT DOCUMENTS 2,576,824 11/1951 Bush ..................... 280/724
2,913,252 11/1959 Norrie ................... 280/713
2,941,817 6/1960 Benson .................. 280/713
3,111,335 11/1963 Hickman ................ 280/724
3,547,215 12/1970 Bird ..................... 280/713

FOREIGN PATENT DOCUMENTS 2262835 12/1972 Fed. Rep. of Germany ...... 280/713

Primary Examiner—John J. Love
Assistant Examiner—Ross Weaver
Attorney, Agent, or Firm—Charles E. Pfund

[57] ABSTRACT

A fluid suspension system is provided for a motor vehicle wheel, the wheel being rotatably mounted on an axle. The fluid suspension system comprises a load arm, an air bellows, and a torque arm. The air bellows is mounted between the load arm and the chassis of the motor vehicle. One end of the load arm supports the axle, the other end of the load arm being attached to the chassis by a first pivot bearing. One end of the torque arm is attached to an axle seat by a second pivot bearing, the other end of the torque arm being attached to the chassis by a third pivot bearing. The torque arm and the load arm extend in the same direction away from the axle. A bearing block is slidably mounted on the torque arm, the bearing block being housed within a slider casing fixed to the chassis. The bearing block and the slider casing are such that the bearing block has substantially no freedom of movement in a direction parallel to the axle.

12 Claims, 4 Drawing Sheets

AIR SUSPENSION SYSTEM

BACKGROUND OF THE INVENTION

This invention relates to a fluid suspension system for a motor vehicle, and in particular to a motor vehicle air suspension system.

Traditionally motor vehicle suspension systems utilise leaf springs associated with the wheels of the vehicle. Such systems are generally satisfactory, in that they adequately control brake and drive torques, as well as preventing lateral movement of the vehicle axles relative to the vehicle chassis. They suffer, however, from the disadvantages of a relatively poor ride, and a relatively large degree of damage to roads.

Air suspension systems are known, and these are generally superior to traditional leaf spring systems in that there is a substantial reduction in road damage, and a softer ride (which gives rise to increased passenger comfort). Unfortunately, known air suspension systems cannot adequately control the lateral movement of the associated axles. Where such movement occurs, there is a tendency for the associated wheels to hit the vehicle bodywork or associated components (such as the air bellows of the suspension system), and this is obviously undesirable. There is also a tendency for axle tracking to occur, and this could lead to the vehicle crabbing badly (that is to say moving in a skew fashion rather than in a straight line). Here, again, this is clearly undesirable.

For example, a known type of air suspension system has an air bellows mounted between a load arm and the chassis of the vehicle. One end of the load arm is pivotally mounted to the chassis forwardly of the wheel being suspended, the other end of the load arm being fixed to the associated axle seat of the axle carrying that wheel. Because of its configuration, this known type of system is known as a trailing arm air suspension system. This system suffers badly from lateral axle movement. It also cannot adequately control the forward and rearward axle tilt resulting from brake and drive torque, unless the load arm is very strong and stiff. If this is the case, however, there is no play in the system, and brake and drive torques are transmitted to the axle casing, and this can lead to breakage to the axle casing. This system can also result in breakage of the axle casing where the axle tilts excessively about the central longitudinal axis of the vehicle, which could arise, for example, from excessively tight cornering or from one wheel hitting an obstacle such as a bump or a pot-hole.

Another known type of air suspension system (see DEAS No. 2224315) utilises a leaf spring or a torsion bar stabiliser for limiting lateral axle movement. This system has the fluid suspension device behind the axle, the fluid suspension device being supported by a load arm which is pivotally attached to the chassis well forward of the axle. Because of the long moment arm between the articulation point of the load arm and the fluid suspension device, this device is pressurised to a significantly less extent than is the case with the standard trailing arm system referred to above. As a result, this type of suspension leads to an excessively soft or "sickly" ride, which is disadvantageous. Another disadvantage of this system is that it does not permit the axle to oscillate about the central longitudinal axis of the vehicle. Consequently, if one wheel only encounters an obstacle such as a bump or pot-hole (or during excessively tight cornering), the entire system can jam with the chassis at an angle to the road surface. Clearly, this will adversely affect the steering and handling of the vehicle, and so is undesirable.

The aim of the invention is to provide a motor vehicle air suspension system which substantially prevents lateral axle movement, and which permits control of brake and drive torques, whilst having sufficient play to prevent excessive forces being transferred to the axle casing.

SUMMARY OF THE INVENTION

The present invention provides a fluid suspension system for a motor vehicle wheel, the wheel being rotatably mounted on an axle, the fluid suspension system comprising a load arm, a fluid suspension device, and a torque arm, the fluid suspension device being mounted between the load arm and the chassis of the motor vehicle, one end of the load arm supporting the axle, the other end of the load arm being attached to the chassis by a first pivot bearing, one end of the torque arm being attached to an axle seat by second pivot bearing, the other end of the torque arm being attached to the chassis by a third pivot bearing, the torque arm and the load arm extending in the same direction away from the axle, wherein a bearing block is slidably mounted on the torque arm, the bearing block being housed within a slider casing fixed to the chassis, the bearing block and the slider casing being such that the bearing block has substantially no freedom of movement in a direction parallel to the axle. In a preferred embodiment, the system includes a fourth pivot bearing. Advantageously, the fourth pivot bearing attaches said other end of the load arm to the axle seat. Alternatively, the fourth pivot bearing is provided partway along the torque arm between the second pivot bearing and the bearing block, and at an angled portion of the torque arm. Preferably, each of the pivot bearings is a rubber bushing.

Advantageously, the bearing block is rotatably mounted on the torque arm. This permits relative rotation between the bearing block and the torque arm, and so permits the axle to rotate about the central longitudinal axis of the vehicle. Consequently, there is no danger of the axle casing breaking, or of the system jamming, during excessively tight cornering or when one wheel hits an obstacle such as a bump or a pot-hole.

Preferably, the torque arm is of circular cross-section, and passes through a complementary circular aperture in the bearing block. Alternatively, the torque arm is of square cross-section, and passes through a complementary square aperture in the bearing block.

Preferably, the bearing block is cuboidal, and the slider casing is a hollow cuboid. Alternatively, the bearing block is of hexagonal or octagonal cross-section. This enables the bearing block to be removed from the slider casing, to be partly rotated, and then to be reintroduced into the slider casing. In this way, a new pair of opposed parallel sides of the bearing block can be brought into sliding engagement with the internal parallel walls of the slider casing when the original pair of opposed parallel sides of the bearing block become worn. Obviously, with a hexagonal bearing block, there are three pairs of sides available; and, with an octagonal bearing block, there are four pairs of sides available. In either case, increased bearing block life results. Conveniently, the internal width of the slider casing (that is to say the dimension parallel to the axle) is substantially the same as the external width of the bearing block, whereby the bearing block has substantially no freedom of movement in a direction parallel to the axle. Advantageously, the slider casing is such as to permit movement of the bearing block therewithin in the other two orthogonal directions. This permits the system a limited amount of play, and so prevents excessive force being transmitted to the axle.

Preferably, the fluid suspension device is an air bellows.

In practice, each wheel associated with said axle will be provided with a fluid suspension system as defined above.

BRIEF DESCRIPTION OF THE DRAWINGS

Four forms of motor vehicle air suspension system, each of which is constructed in accordance with the invention, will now be described in detail, by way of example, with reference to the accompanying drawings, in which.

DESCRIPTION OF PREFERRED EMBODIMENTS

Figure 1:
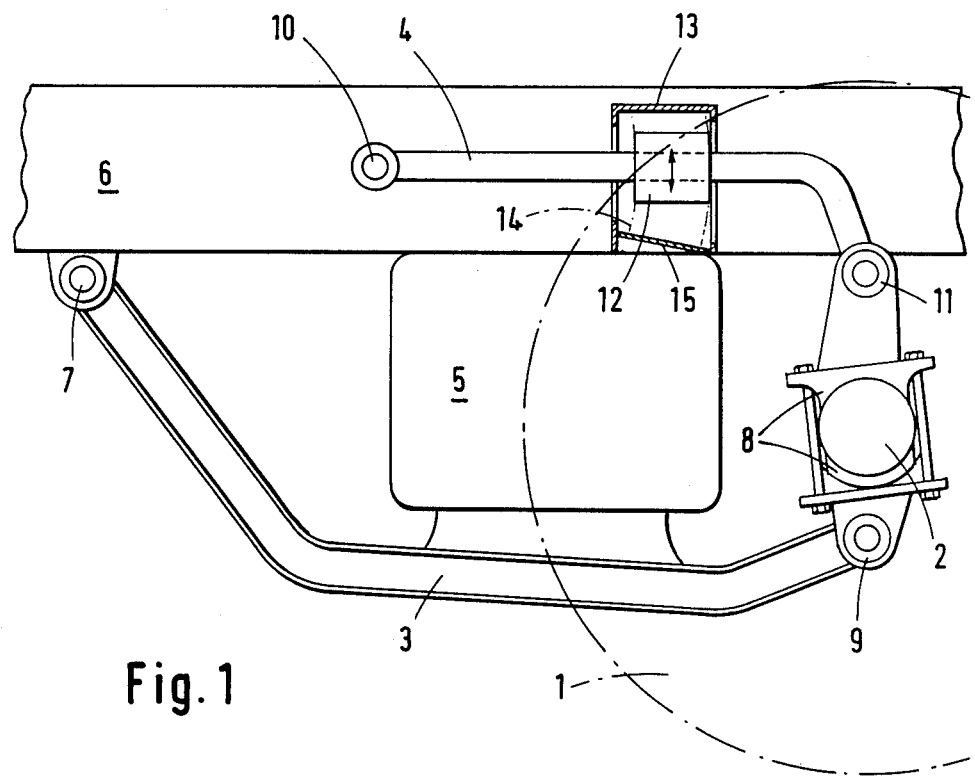
FIG. 1 is a schematic side elevation of the first form of air suspension system.

Referring to the drawings, FIG. 1 shows an air suspension system associated with a rear wheel 1 of a commercial motor vehicle. The wheel 1 is rotatably mounted on an axle 2. The wheel 1 is supported by a suspension system which comprises a load arm 3, a torque arm 4, and an air bellows 5. The air bellows 5 is mounted between the top of the load arm 3 and the base of the chassis 6. One end of the load arm 3 is attached to the chassis 6 of the motor vehicle by a rubber pivot bearing 7, the other end of the load arm being attached to an axle seat 8 associated with the axle 2 by a rubber pivot bearing 9.

One end of the torque arm 4 is attached to the chassis 6 by means of a rubber pivot bearing 10, the other end of the torque arm being attached to the axle seat 8 by a rubber pivot bearing 11. The torque arm 4 is of circular cross-section, and carries a cuboidal slider bearing block 12. The bearing block 12 is made of nylon, and is free to slide on, and rotate about, the torque arm 4. The bearing block 12 is housed within a slider casing 13 fixed to the chassis 6. The slider casing is such that the bearing block 12 is free to move vertically therewithin over a predetermined distance. The block 12 is also free to move a slight distance backwards and forwards, but it cannot rotate or move laterally within the casing 13.

A similar air suspension system would be provided for the other wheel (not shown) associated with the axle 2. Where there are two or more rear axles, each may be provided with a pair of air suspension systems of this type.

Figure 2:
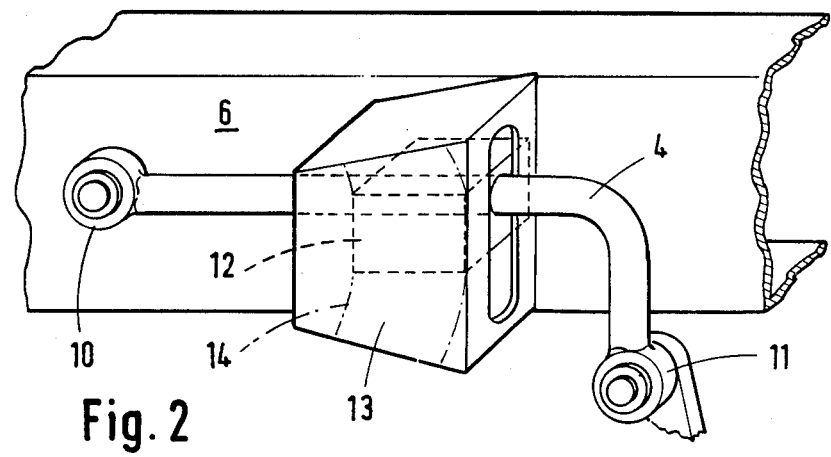
FIG. 2 is a perspective view of part of the system of FIG. 1.
Figure 3:
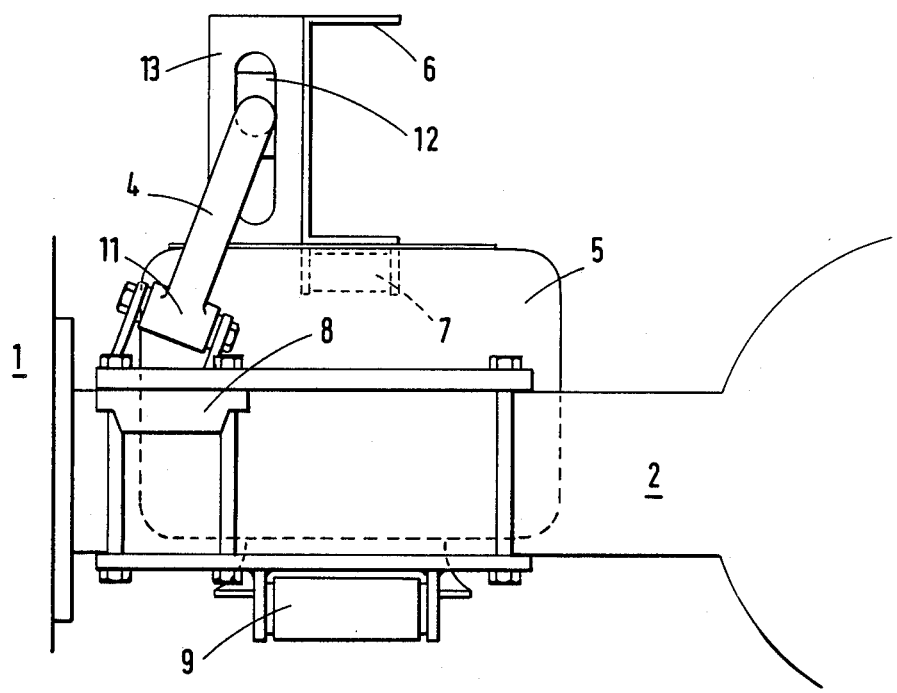
FIG. 3 is an end elevation of the system of FIGS. 1 and 2.
Figure 4:
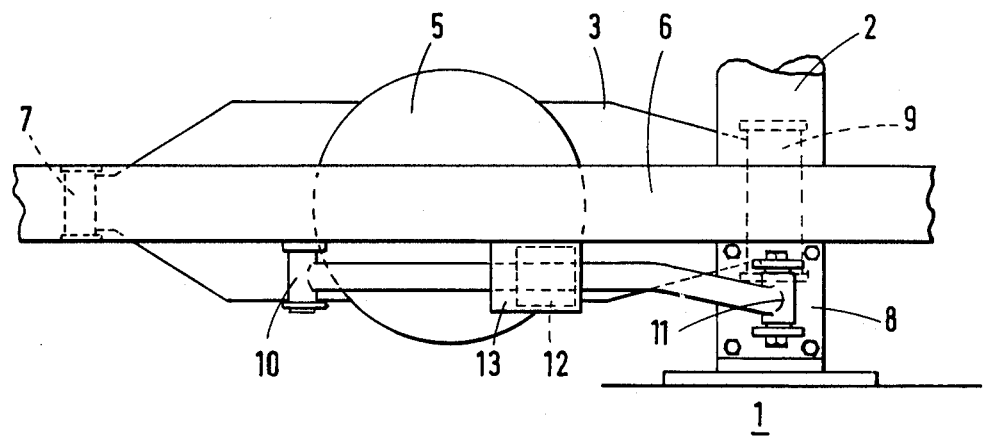
FIG. 4 is a plan view of the system of FIGS. 1 to 3.

In use, the air bellows 5 of the air suspension systems provide the suspension for the vehicle. The air suspension systems are effective to control the various axle movements which tend to occur during operation. Lateral movement of a given axle 2 is controlled by the two torque arms 4 of that axle. Thus, when the axle 2 tends to drift to either side (in which case the torque arms 4 will tend to move in the same direction and away from the chassis 6), this movement is restricted by the engagement of the slider bearing blocks 12 with the side walls of their slider casings 13. Any excess force will be absorbed by the rubber bearings 10 and 11 at the opposite ends of the torque arms 4. Moreover, because the torque arms 4 can revolve within, and move longitudinally relative to, their slider bearing blocks 12, and the bearing blocks can move vertically and back and forth within the slider casings 13, the torque arms can still execute their normal up and down movements. As this happens, the blocks 12 move through an arc 14 (see FIG. 2).

Brake and drive torques are also controlled by the torque arms 4. Thus, when the axle 2 tries to tip forwards or backwards, the rubber bearings 7, 9, 10 and 11 restrict axle movement. The bearings 7, 9, 10 and 11 (which constitute a four-point articulated system) do, however, permit a limited amount of play, so that excessive forces are not transmitted to the axle casing.

As shown in FIG. 1, an inclined surface 15 is provided at the base of each slider casing 13. The surfaces 15 constitute a positive stop limiting relative movement between the chassis 6 and the axle 2. Thus, excessive axle drop is prevented when the vehicle is lifted, jacked up, or hits a pot-hole in the road.

Figure 5:
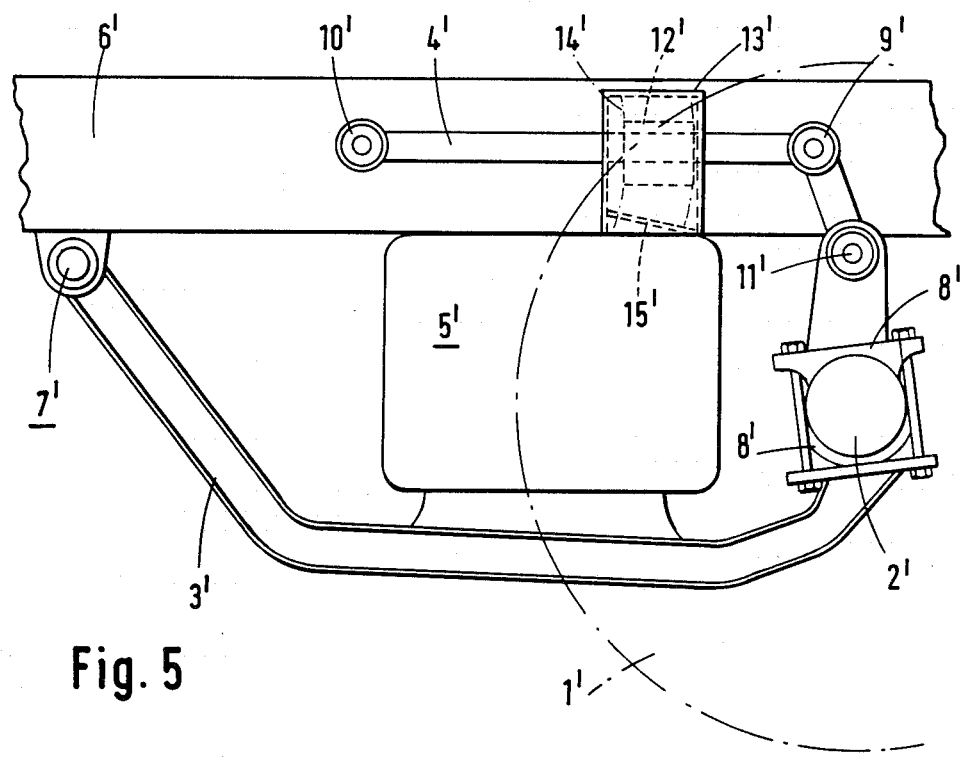
FIG. 5 is a schematic side elevation of the second form of air suspension system.

FIG. 5 shows a modified form of air suspension system. Consequently, like (but primed) reference numerals will be used for like parts, and only the modified parts will be described in detail. This modification permits the invention to be used with vehicles already fitted with a standard trailing arm suspension system. In such a case, the load arm 3' of the trailing arm suspension system is already fixed rigidly to the axle seat 8' of the axle 2'. Accodingly, in order to take advantage of the four-point pivot design of the air suspension system of the invention, an additional rubber pivot bearing 9' must be provided part way along the torque arm 4'.

Figure 6:
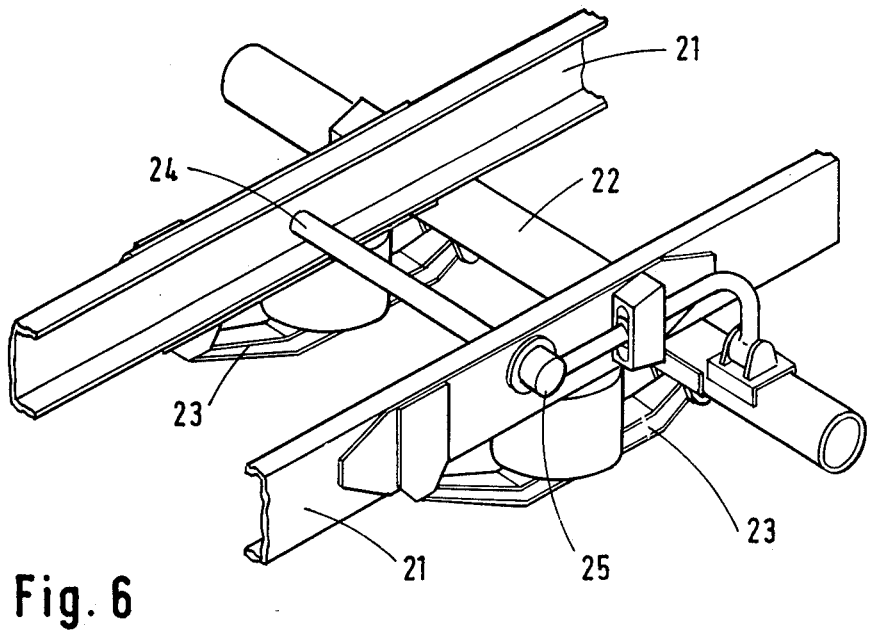
FIG. 6 is a schematic perspective view of part of a motor vehicle chassis, axle and a third form of air suspension system.

FIG. 6 shows a third form of air suspension system, in which a motor vehicle chassis 21 supports an axle 22. At each end, the axle 22 rotatably supports a respective wheel (not shown) of the motor vehicle. A respective air suspension arrangement 23 is associated with each of the wheels, the air suspension arrangement being of the type described above with reference to FIGS. 1 to 4. A torsion bar 24 is linked across the chassis 21, and is attached to the torque arms 4 of the air suspension arrangements 23. These attachments can be rigid fixings, or splined or keyed fixings. The torsion bar 24 is supported on the chassis 21 by means of bushes 25.

The torsion bar 24 improves the roll stability of the motor vehicle, and this is particularly important for high-sided commercial vehicles and motor coaches. The need for the torsion bar 24 arises because of the way the air suspension arrangements 23 are fitted to the vehicle. Thus, in conventional vehicle suspension systems, the axle itself contributes to roll stability. However, because the load arms 3 of the air suspension arrangements 23 are pivoted to the axle 22, it cannot contribute significantly to roll stability. Hence, where additional roll stability is required, when using this type of air suspension system, additional means must be provided, and the provision of the torsion bar 24 is a convenient way of accomplishing this.

Figure 7:
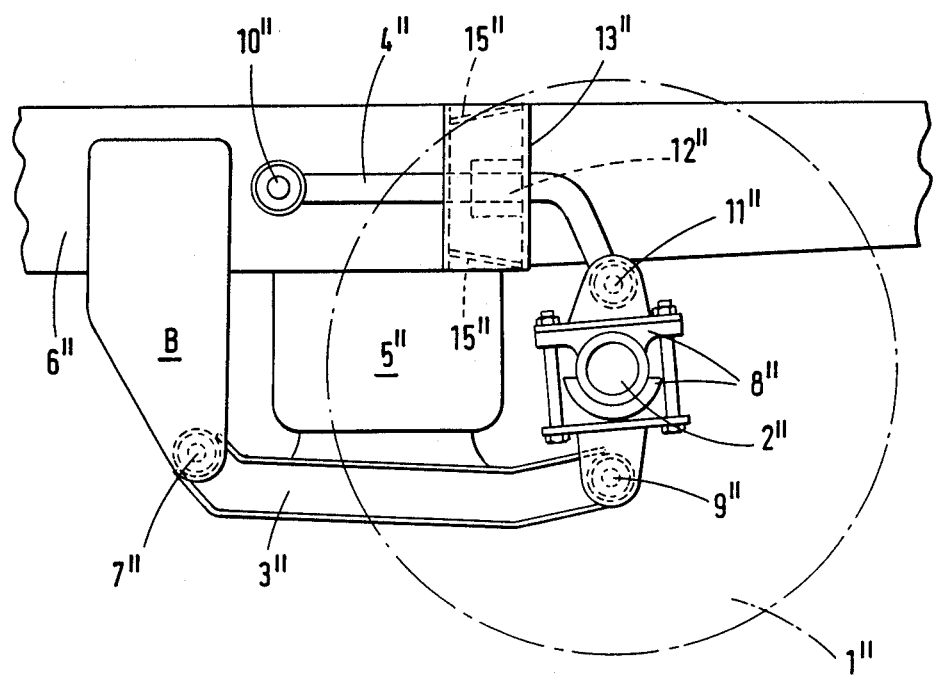
FIG. 7 is a schematic side elevation of the fourth form of air suspension system.

FIG. 7 shows a fourth form of air suspension system, this system again being a modification of that shown in FIGS. 1 to 4. Consequently, like (but double primed) reference numerals will be used for like parts, and only the modified parts will be described in detail. The main difference between this embodiment and that of FIGS. 1 to 4, is that the load arm 3" is pivotably attached, by means of a pivot joint 7", to a bracket B fixed to the chassis 6". This results in the four pivot points 7", 9", 11" and 10" defining a linkage which approximates to a parallelogram linkage. The main advantage of this is that the prop shaft flange of the vehicle remains substantially vertical for all vehicle loadings, and so ensures a relatively quiet and good drive transmission. In this connection, it should be noted that, with known suspension systems, the prop shaft flange is deliberately angled backwards so that, when the vehicle is laden, the compression of the suspension (and the resultant movement of the drive axle) ensure that the prop shaft flange is brought into its optimum, vertical position.

Another difference between this embodiment and that of FIGS. 1 to 4, is that the slider casing 13 is provided with inclined stop surfaces 15" at the top and bottom thereof.

It will be apparent that other modifications could be made to the air suspension systems described above. For example, the bearing block could have a square location aperture for the torque arm (which would then be of square cross-section, or which would have a portion of square cross-section). This would prevent relative rotation between the torque arm and the bearing block, which, in some applications, is advantageous. It would also be possible to extend the load arm beyond the pivot bearing connecting the load arm to the axle seat, so that the load arm extension could constitute an alternative support arm for the air bellows. It should also be noted that all the torque arm bushes can be installed in various positions, that is to say parallel to the axle or at right-angles thereto. This is because the bushes used are capable of taking up torsional, conical, axial and load radial movements.

The air suspension system of the invention substantially prevents the lateral movement of a motor vehicle axle. It also permits the control of brake and drive torques, without transmitting excessive, damaging force to the axle casing. Moreover, it permits the axle to tilt about the central longitudinal axis of the vehicle, and so avoids jamming of the system (or the risk of the axle casing breaking) during excessively tight cornering or in the event of one wheel hitting an obstacle such as a bump or a pot-hole. The system is also versatile, in that is can be fitted either way round, that is to say with the load and torque arms either forwardly or rearwardly of the axle. The great advantage of this, is that the system can be used with practically any vehicle without running foul of the many components (such as brake chambers, shock absorbers, exhaust systems and cables) which are fixed to the underneath of a motor vehicle chassis. The system is primarily intended for use on rear axles of commercial motor vehicle. It could, however, be used on the front (steering) axles of such vehicles. It could also be used on light motor vehicles such as light vans and cars.

I claim:

1. A fluid suspension system for a motor vehicle wheel, the wheel being rotatably mounted on an axle, the fluid suspension system comprising a load arm, a fluid suspension device, and a torque arm, the fluid suspension device being mounted between the load arm and the chassis of the motor vehicle, one end of the load arm supporting the axle, the other end of the load arm being attached to the chassis by a first pivot bearing, one end of the torque arm being attached to an axle seat by a second pivot bearing, the other end of the torque arm being attached to the chassis by a third pivot bearing, the torque arm and the load arm extending in the same direction away from the axle, wherein a bearing block is slidably mounted on the torque arm, the bearing block being housed within a slider casing fixed to the chassis, the bearing block and the slider casing being such that the bearing block has substantially no freedom of movement in a direction parallel to the axle.

2. A system according to claim 1, wherein the system includes a fourth pivot bearing.

3. A system according to claim 2, wherein the fourth pivot bearing attaches said other end of the load arm to the axle seat.

4. A system according to claim 2, wherein the fourth pivot bearing is provided part-way along the torque arm between the second pivot bearing and the bearing block, and at an angled portion of the torque arm.

5. A system according to claim 2, wherein each of the pivot bearings is a rubber bushing.

6. A system according to claim 1, wherein the bearing block is rotatably mounted on the torque arm.

7. A system according to claim 6, wherein the torque arm is of circular cross-section, and passes through a complementary circular aperture in the bearing block.

8. A system according to claim 1, wherein the bearing block is cuboidal, and the slider casing is a hollow cuboid.

9. A system according to claim 1, wherein the internal width of the slider casing is substantially the same as the external width of the bearing block, whereby the bearing block has substantially no freedom of movement in a direction parallel to the axle.

10. A system according to claim 1, wherein the slider casing is such as to permit movement of the bearing block therewithin in the other two orthogonal directions.

11. A system according to claim 1, wherein the fluid suspension device is an air bellows.

12. A system according to claim 1, wherein the other end of the load arm is pivotally attached to a bracket fixed to the chassis.

* * * * *